US005788211A

United States Patent [19]
Astier

[11] Patent Number: 5,788,211
[45] Date of Patent: Aug. 4, 1998

[54] FIXING PIECE FOR DATA STORAGE DRIVE AND OTHER UNITS

[75] Inventor: Christian Astier, Grenoble, France

[73] Assignee: Hewlett-Packard Company, Palo Alto, Calif.

[21] Appl. No.: 699,363

[22] Filed: Aug. 19, 1996

[30] Foreign Application Priority Data

Sep. 13, 1995 [EP] European Pat. Off. ............ 95410106

[51] Int. Cl.⁶ .................................................. H05K 5/00
[52] U.S. Cl. .................. 248/674; 248/222.12; 248/300; 312/223.3; 361/685
[58] Field of Search .................. 248/205.3, 581, 248/611, 674, 300, 680, 682, 500, 309.1, 220.41, 222.11, 222.12, 551, 174; 361/685, 684; 312/111, 108, 223.2, 223.3

[56] References Cited

U.S. PATENT DOCUMENTS

| | | |
|---|---|---|
| 4,696,449 | 9/1987 | Woo et al. .................. 248/309.1 X |
| 5,080,310 | 1/1992 | Choi ............................. 248/222.11 |
| 5,127,615 | 7/1992 | Jones . |
| 5,131,620 | 7/1992 | Boundy . |
| 5,169,097 | 12/1992 | Yasukawa ................... 248/551 X |
| 5,262,923 | 11/1993 | Batta et al. .................... 361/685 |
| 5,301,088 | 4/1994 | Liu . |
| 5,398,157 | 3/1995 | Paul ........................ 248/221.11 X |
| 5,463,527 | 10/1995 | Hager et al. ................. 361/685 |
| 5,548,480 | 8/1996 | Rudi et al. ................... 361/685 |
| 5,564,804 | 10/1996 | Gonzalez et al. .......... 361/685 X |
| 5,613,655 | 3/1997 | Marion ...................... 248/316.5 X |

FOREIGN PATENT DOCUMENTS

| | | |
|---|---|---|
| 9003249.7 | 3/1990 | German Dem. Rep. . |
| 55-124577 | 9/1980 | Japan . |
| 2242304 | 2/1991 | United Kingdom . |

OTHER PUBLICATIONS

*IBM Technical Disclosure Bulletin*, vol. 30, No. 11, Apr. 1988, pp. 144–145.
European Search Report, EP 95 41 0106, dtd 8 Mar. 1996.

Primary Examiner—Ramon O. Ramirez
Assistant Examiner—Derek Berger

[57] ABSTRACT

A fixing piece is provided for use in fixing a data-storage drive unit and similar units in position on a support structure. The fixing piece is of one-piece plastics form with predetermined fold lines about which the fixing piece can be folded to at least partially encompass the unit. The fixing piece is formed with projections for engaging in holes in the walls of the unit to restrain movement of the latter, and snap-engagable elements for snap engaging in apertures in the support structure to attach the fixing piece, and thereby a unit about which it is folded, to the support structure. A stackable form of this fixing piece is also provided.

8 Claims, 4 Drawing Sheets

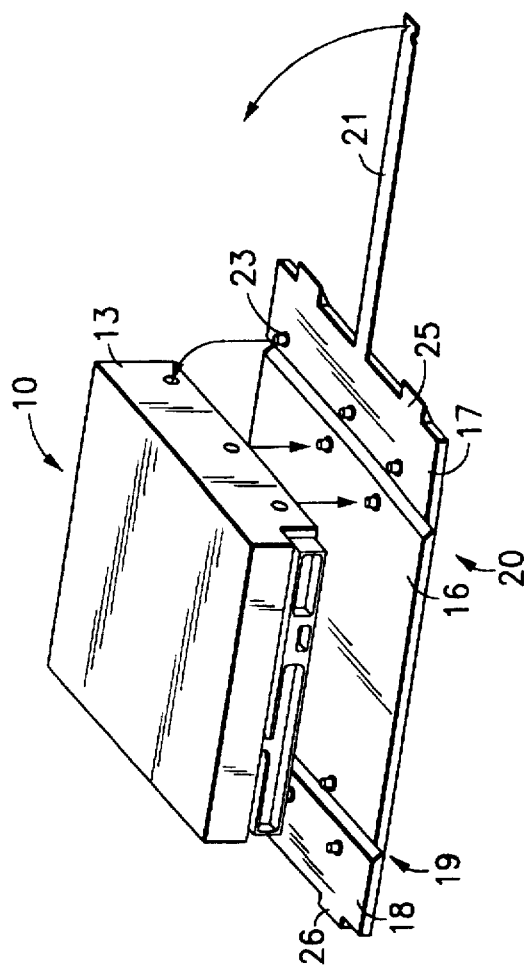
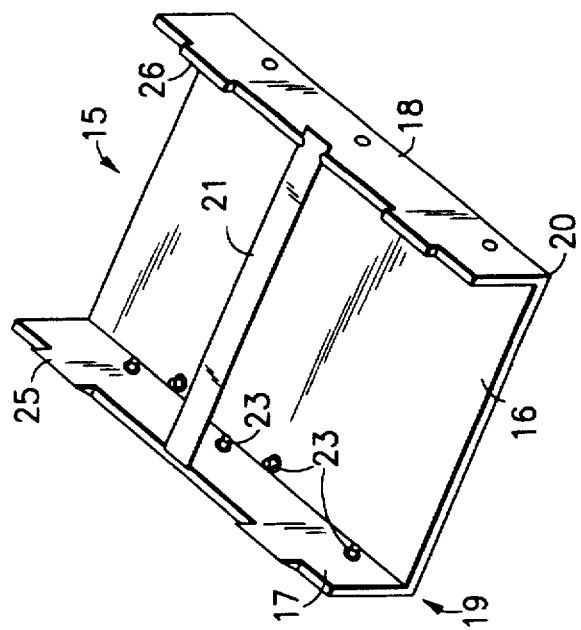
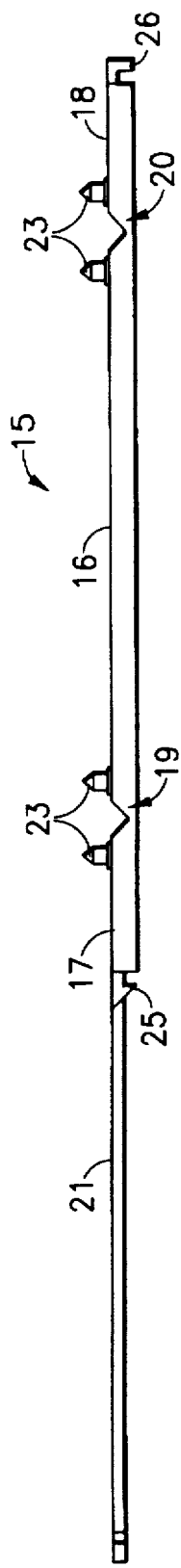

FIXING PIECE FOR DATA STORAGE DRIVE AND OTHER UNITS

FIELD OF THE INVENTION

The present invention relates to a fixing piece for use in fixing a data-storage drive unit or similar unit in position on a support structure such as the chassis of a personal computer.

BACKGROUND OF THE INVENTION

FIG. 1 illustrates a typical disc drive 10 such as is conventionally fitted in a modern personal computer. Whether the disc drive is a hard disc drive, a floppy disc drive or an optical storage drive (eg CD ROM drive), the drive will generally be of a standard form factor and provided with fixing holes 12 in standard positions (three along each side face 13 and four in the top face 14 of the drive 10). Whatever the form or make of the drive, it then becomes possible for a computer manufacturer to provide a standard mounting arrangement that typically takes the form of a metal frame with side bars having fixing holes through which self-tapping screws can be inserted to engage in the holes 12 in the side faces of the drive. Whilst this standard disposition of the holes 12 is of great help to the computer manufacturer, the use of fixing screws for securing the drive in position is not ideal, the fixing operation being intricate and time-consuming.

Other ways of fixing data-storage drives in position are known and two such ways are illustrated in U.S. Pat. No. 5,306,079. In particular, in FIG. 1 of that patent, a hard-disc drive 3 is shown as being mounted on a chassis plate 30 that engages in hooks 110 of a support frame 1 and is held in position by a resilient retainer 111. Also in FIG. 1, a floppy disc drive 40 is shown as having two resilient members 42 attached to its sides, these members snap engaging in apertures in the support frame to hold the drive in place. Whilst both these fixing arrangements provide for ready attachment (and release) of the corresponding drive to the support frame 1, both require the use of an intermediate fixing member that must first be secured to the drive.

It is an object of the present invention to provide a fixing piece for simplifying the attachment of a data-storage drive and similar units to a support structure.

SUMMARY OF THE INVENTION

According to the present invention, there is provided a fixing piece for use in fixing a data-storage drive unit in position on a support structure, the fixing piece being of one-piece plastics form with predetermined fold lines about which the fixing piece can be folded to at least partially encompass said unit, the fixing piece being formed with locating means for engaging the unit to restrain movement of the latter, and attachment means snap engagable in apertures in said support structure to attach the fixing means, and thereby a said unit about which it is folded, to the support structure.

Advantageously, the locating means comprises protusions that with the fixing piece engaged around the unit, project inwardly to engage in holes formed in at least one of said at least three sides of the unit. Thus, where the fixing piece is to be used to attach a data-storage drive unit in position, the protusions can generally be provided in positions corresponding to the positions of the standard fixing holes normally provided in such units.

Preferably, the attachment means comprise a plurality of elements which when the fixing piece is engaged about the unit, project in a common direction away from the unit for engagement in apertures in the support structure, at least some of the elements being snap engagable in corresponding ones of the apertures in the support structure. Further, in a preferred embodiment, in addition to said snap engagable elements, the attachment means includes L-shaped elements intended to be inserted into corresponding apertures in the support structure prior to the insertion of the snap-engagable elements in their corresponding apertures, the free ends of the L-shaped elements engaging behind the edges of their corresponding apertures in the support structure.

To facilitate use of the fixing piece, the latter is preferably formed with a strap that can be used to hold the fixing piece engaged around the unit prior to fixing piece being fixed to the support structure.

In one preferred embodiment, the fixing piece is formed with means intended to engage with the attachment means of a further fixing piece such as to permit the stacking of units using the fixing pieces, a fixing piece onto which a further fixing piece and unit is attached constituting the support structure for the latter.

BRIEF DESCRIPTION OF THE DRAWINGS

Embodiments of the invention will now be described, by way of non-limiting example, with reference to the accompanying diagrammatic drawings, in which:

FIG. 3 is a perspective view of the FIG. 2 fixing piece shown in a folded position but without a drive unit present;

FIG. 4 is an enlarged view of the FIG. 2 fixing piece taken in direction A of that Figure, certain features being shown slightly exaggerated in size for clarity;

FIG. 5 is a perspective view depicting folding of the FIG. 2 fixing piece about a drive unit of the FIG. 1 form;

BEST MODE FOR CARRYING OUT THE INVENTION

Figure 1:
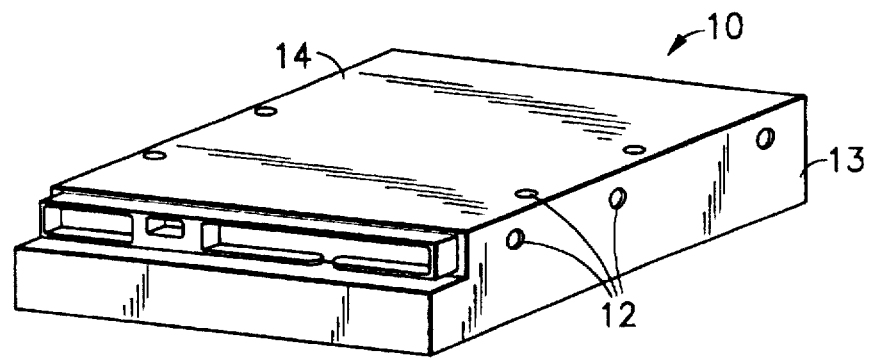
FIG. 1 is a perspective view of a known data-storage drive unit.
Figure 2:
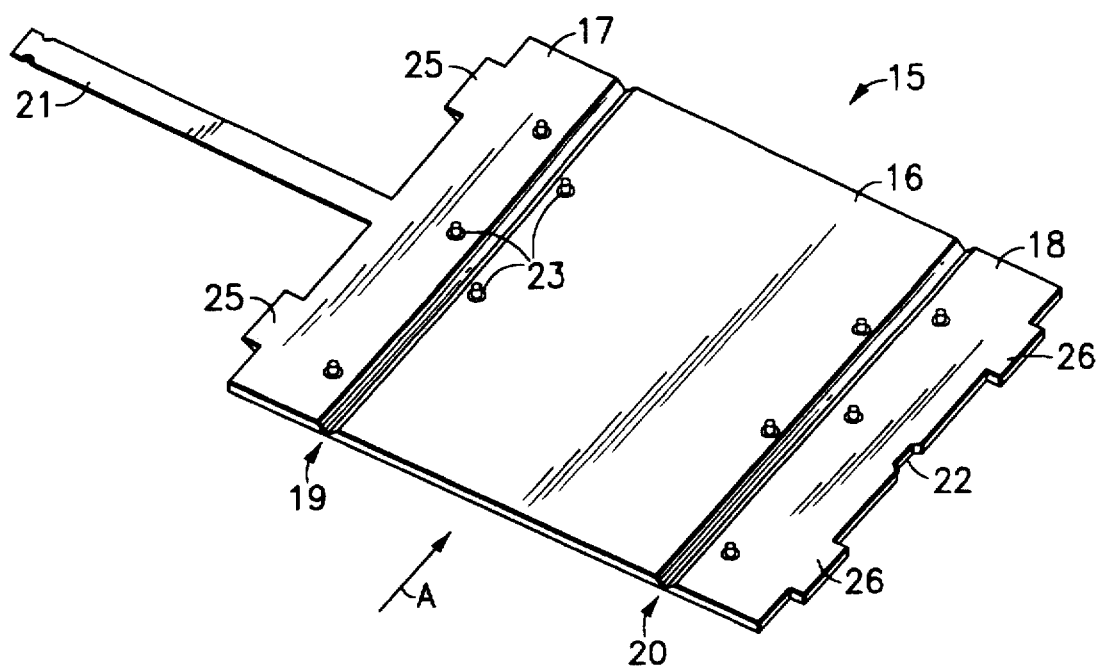
FIG. 2 is a perspective view of a first fixing piece embodying the invention, the fixing piece being shown in an initial, flat, position.
Figure 6:
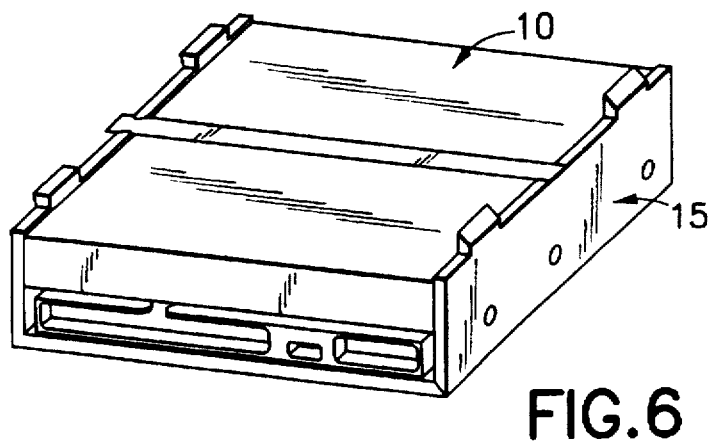
FIG. 6 is a view similar to FIG. 5 but showing the fixing piece fully folded about the drive unit.

FIGS. 2 to 8 of the drawings show the first form of fixing piece embodying the invention and the manner in which it is used to fix the data-storage drive unit 10 (FIG. 1) to a chassis plate. In particular FIG. 2 shows this fixing piece 15 in perspective in its initial flat form. The fixing piece 15 is of one-piece plastics construction being, for example, moulded from polypropylene, and comprises three main sections 16, 17 and 18 interconnected by two hinge portions 19, 20 formed by local thinning of the fixing piece along predetermined fold lines. These hinge portions 19, 20 permit the side sections 17 and 18 to be folded up to extend at right angles to the central section 18, as is illustrated in FIG. 3. A strap portion 21 extending from one of the side sections 17 can be folded over and engaged with a notch 22 formed in the other side section 18 to temporarily hold the fixing piece 15 in its folded position.

The dimensioning of the sections 16, 17 and 18 is such that the fixing piece can be folded about the drive unit 10 with the sections 16, 17 and 18 lying against the top face 14 and side faces 13 respectively of the drive unit.

The fixing piece 15 is provided with ten projections 23 positioned on the sections 16, 17 and 18 in correspondence with the holes 12 provided in the top and side faces 14, 13 of the unit 10. Theses projections 23 serve as locating means that engage in the holes 12 when the fixing piece is folded about the drive 10 whereby to restrain movement of the drive relative to the fixing piece.

The fixing piece 15 is further provided with attachment elements 25, 26 for attaching the fixing piece, folded about the drive 10, to a chassis plate. The form of these attachment elements 25, 26 can best be seen in FIG. 4 where they are shown slightly enlarged relative to other features of the fixing piece for reasons of clarity. More particularly, the side section 17 is provided with two attachment elements 25 formed to snap engage with the edges of an aperture formed in a chassis plate as the elements 25 are pushed into the aperture. To facilitate this snap-engagement effect, the material chosen for the fixing piece should be resiliently deformable at least to some extent. The side section 18 is provided with two further attachment elements 26, these elements being L-shaped to hook behind the edges of corresponding apertures provided in a chassis plate.

FIGS. 5 to 8 illustrate use of the fixing piece 15. This involves first engaging the fixing piece 15 with the drive, for example by inverting the drive and seating its top face 14 (now underneath) on the central section 16 of the fixing piece so that the projections 23 provided on section 16 locate in the holes 12 in face 14 (see FIG. 5). The side sections 17, 18 of the fixing piece are then folded up against the side faces 13 of the drive, thereby locating the projection 23 provided on the sections 17 and 18 in the holes 12 in the side faces 13. The strap 21 is next folded across the bottom face (currently uppermost) of the drive and engaged in notch 22 to hold the fixing piece 15 in position about the drive (see FIG. 6).

Figure 7:
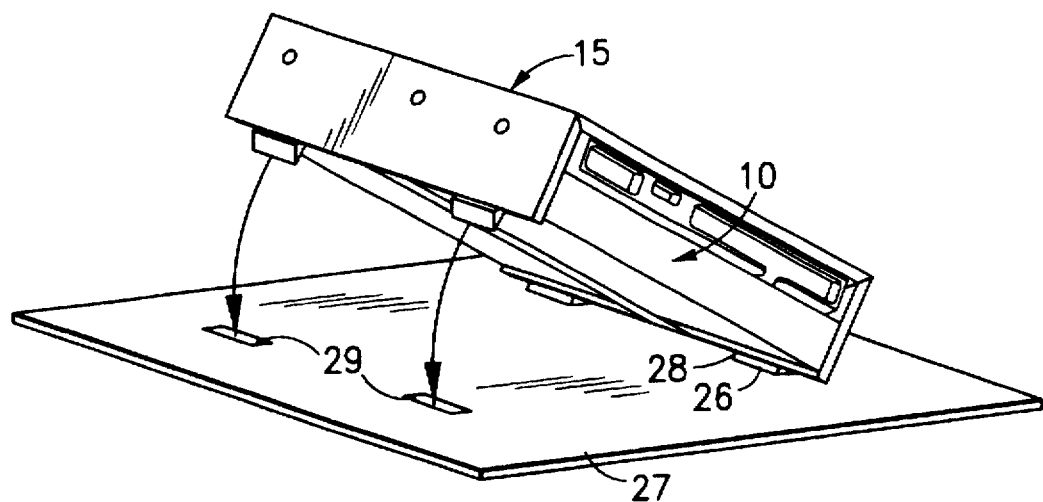
FIG. 7 is a perspective view depicting engagement of the combination of fixing piece and drive unit shown in FIG. 6, with a chassis plate.
Figure 8:
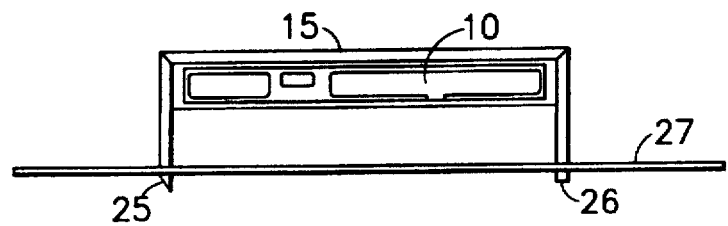
FIG. 8 shows the fixing piece / drive unit combination of FIG. 6 fully engaged with the FIG. 7 chassis plate.

Next, the L-shaped attachment elements 26 are hooked into apertures 28 formed in a chassis plate 27 (FIG. 7). The fixing piece and drive are then pivoted down to lie flat on the plate 27, this action snap engaging the attachment elements 25 in corresponding apertures 29 in the plate 27. The drive 10 is now held fast by the fixing piece 15 on the chassis plate 27 (FIG. 8).

Figure 9:
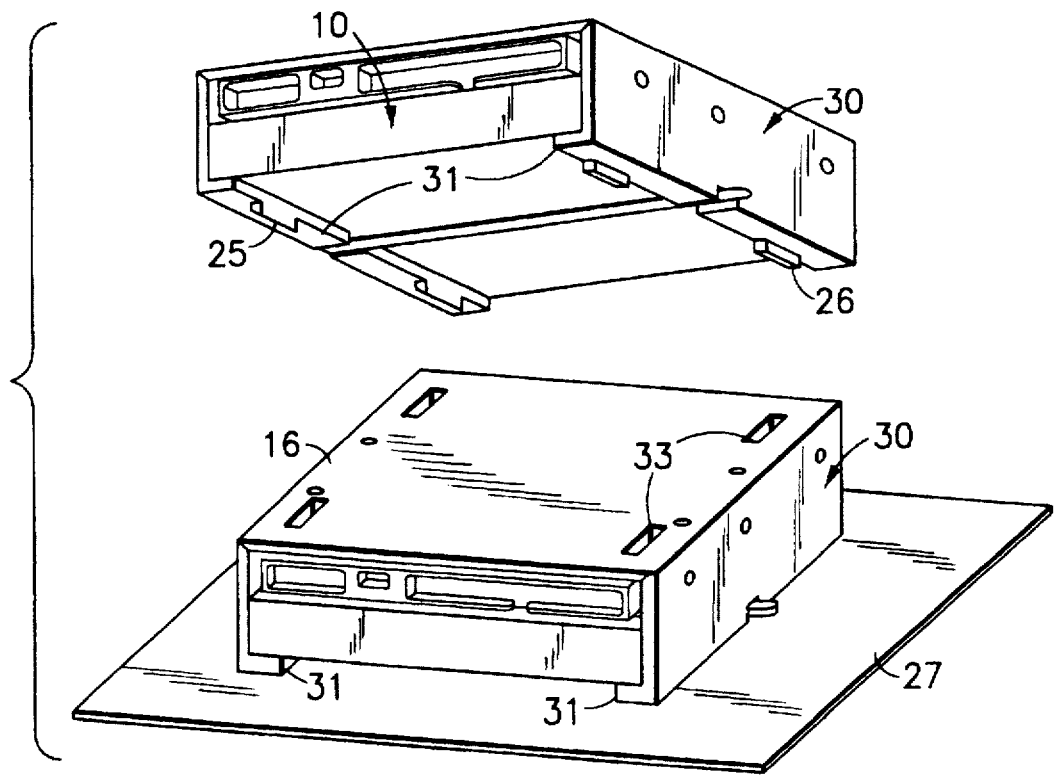
FIG. 9 is a perspective view illustrating a second form of fixing piece embodying the invention, two such fixing pieces being shown engaged around respective drive units, the fixing pieces being engagable with each other to permit stacking of the drive units.
Figure 10:
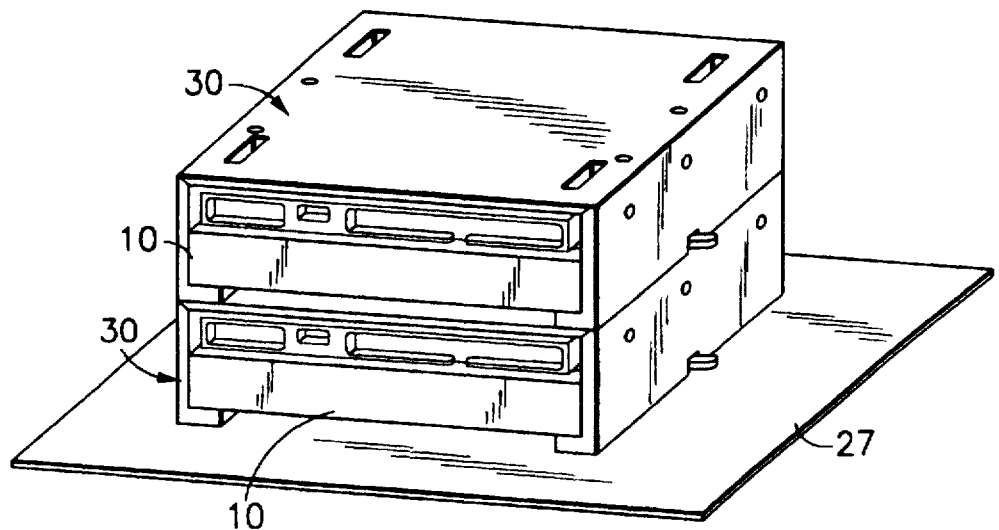
FIG. 10 is a view similar to FIG. 9 but showing the two drive units stacked on each other.

FIGS. 9 and 10 illustrate a second form of fixing piece embodying the invention. This fixing piece 30 is similar to the fixing piece 15 but now each side section 17, 18 is formed with an upstanding flange portion 31 which engages the underside of the drive unit. It is possible to provide each flange portion 31 as a further hinged section of the fixing piece but it is simpler to mould it directly as upstanding from the corresponding side section 17, 18.

The attachment elements 25, 26 are formed on the flange portions 31 with the result that when the fixing piece 30 is folded about the drive 10, the attachment elements lie inwardly of the corner edges of the drive.

The central section 16 of the fixing piece is formed with apertures 33 positioned to receive the attachment elements 25, 26 of another fixing piece 30 in its folded condition such that the attachment elements 25, 26 of the second fixing piece can appropriately engage the edges of the apertures to secure the second fixing piece onto the first. This permits stacking of drives 10 as is illustrated in FIG. 10.

It may be noted that if the thickness of the central section 16 of the fixing piece is the same as that of the chassis plate 27, the attachment elements 25, 26 would generally need to protrude through the apertures 33 to have their securing effect. If the main section 16 lies right up against the top face 14 of the drive 10, it will then be necessary to ensure that the top face 14 is appropriately recessed to receive the protruding elements 25, 26. A better solution is either to provide spacing lands on the main section 15 to hold the latter off the top face 14 of the drive (these lands could be provided around the base of the projections 23), or to make the main section 16 thicker so that the elements do not protrude and then appropriately profile the apertures 33 to ensure that the elements can continue to engage edges of the apertures 33 to effect their securing action.

Many variants are possible to the above-described forms of fixing piece. Thus, for example, the fixing piece could be moulded directly in a form corresponding to the folded forms of the described fixing pieces; in this case, the fixing piece would need to be sufficiently resiliently deformable as to permit the side sections 17, 18 to be flexed outward to permit introduction of the drive 10.

Different forms of location means for restraining movement of the drive relative to the fixing piece are also possible. Thus, if the drive 10 is provided with external projections, the fixing piece can be formed to engage around such projections. Alternatively, the fixing piece could be formed with flanges along the edges of sections 16 to 18 that extend in the same direction as the strap 21, these flanges being disposed to engage the front and rear end faces of the drive thereby boxing it in. Such as arrangement is not preferred since it is not appropriate for use with drives that need to have their front end faces projecting through the casing of a computer for access by a user.

The attachment elements of the fixing piece may also be differently formed. For example, if the chassis plate 27 is provided with mushroom-headed bosses, the attachment means of the fixing piece may simply take the form of apertures in external flanges of the fixing piece, the bosses snap engaging in these apertures. Again, this is not a preferred arrangement as it requires the chassis plate to be provided with special pieces (the mushroom-headed bosses).

With regard to the stackable form of the fixing piece, it is not essential that the elements 25, 26 be provided on flange portions 31 as with the fixing piece 30. For example, a fixing piece similar to the fixing piece 15 could be provided in which the four attachment elements are all snap-engagable in form (like the elements 25),these elements being arranged to snap engage in open pockets provided on another fixing piece, on the external faces of the side sections 17 and 18 of that piece adjacent the main section 16.

The strap 21, whilst preferred, is not essential.

The described forms of fixing piece can be used with other units of rectangular cross-section besides data-storage drive units. Indeed, the fixing piece can be used with units of other cross-sectional form.

I claim:

1. A fixing piece for use in fixing a data-storage drive unit in position on a support structure, the fixing piece being of one-piece plastics form with predetermined fold lines about which the fixing piece can be folded to at least partially encompass said unit, the fixing piece being formed with locating means for engaging the unit to restrain movement of the latter, and attachment means snap engagable in apertures in said support structure for attaching the fixing piece, and thereby said unit, to the support structure.

2. A fixing piece according to claim 1, wherein said locating means comprise projections for engaging in holes in the walls of the unit.

3. A fixing piece according to claim 1, wherein said attachment means comprise a plurality of elements which when the fixing piece is engaged about the unit, project in a common direction away from the unit for engagement in said apertures in said support structure, at least some of said elements being snap engagable in corresponding ones of said apertures.

4. A fixing piece according to claim 3, wherein in addition to said snap engagable elements, the attachment means includes L-shaped elements intended to be inserted into corresponding ones of said apertures in said support structure prior to the insertion of said snap-engagable elements in their corresponding apertures, said L-shaped elements having free ends which engage behind the edges of their corresponding apertures in the support structure.

5. A fixing piece according to claim 1, further including a strap that can be used to hold the fixing piece engaged around the unit prior to the fixing piece being fixed to the support structure.

6. A fixing piece according to claim 1, wherein the fixing piece is formed with means intended to engage with the attachment means of a further said fixing piece thereby permitting stacking of units using said fixing pieces by using a first fixing piece as the support structure for a second fixing piece.

7. A fixing piece according to claim 1, wherein the fixing piece comprises four portions for engaging four sides of a unit of rectangular cross-section and has at least two opposed free edges, said attachment means comprising snap-engagable elements formed on at least one of the portions of said fixing piece adjacent at least one of the opposed edges, said snag engagable elements projecting substantially perpendicularly away from said at least one portion and being snap engagable in apertures in said support structure.

8. A fixing piece according to claim 7, wherein one of said portion of the fixing piece is formed with apertures for receiving the attachment means of a further said fixing piece such as to permit the stacking of units using said fixing pieces.

* * * * *

UNITED STATES PATENT AND TRADEMARK OFFICE
CERTIFICATE OF CORRECTION

PATENT NO. : 5,788,211
APPLICATION NO. : 08/699363
DATED : August 4, 1998
INVENTOR(S) : Christian Astier It is certified that error appears in the above-identified patent and that said Letters Patent is hereby corrected as shown below:

Claim 8, Column 6, line 20, delete "portion" and insert therefor --portions--

Signed and Sealed this

Twenty-first Day of October, 2008

JON W. DUDAS
*Director of the United States Patent and Trademark Office*